United States Patent

Gaul

[11] Patent Number: 5,572,360
[45] Date of Patent: Nov. 5, 1996

[54] MICROSCOPE STAND FOOT WITH A CARRIER FOR BRACING A CYLINDRICAL TUBE OF AN ILLUMINATION DEVICE IN A NON-DISPLACEABLE MANNER

[75] Inventor: Norbert Gaul, Solms-Oberbiel, Germany

[73] Assignee: Leica Mikroskopie und Systeme GmbH, Wetzlar, Germany

[21] Appl. No.: 397,241

[22] PCT Filed: Aug. 2, 1993

[86] PCT No.: PCT/DE93/00678

§ 371 Date: Mar. 17, 1995

§ 102(e) Date: Mar. 17, 1995

[87] PCT Pub. No.: WO94/07171

PCT Pub. Date: Mar. 31, 1994

[30] Foreign Application Priority Data

Sep. 19, 1992 [DE] Germany .......................... 42 31 468.2

[51] Int. Cl.⁶ .............................. G02B 21/00; G02B 21/06
[52] U.S. Cl. ........................ 359/390; 359/381; 359/385; 359/391
[58] Field of Search ........................ 359/368, 381, 359/383, 384, 385, 390, 391, 392

[56] References Cited

U.S. PATENT DOCUMENTS

| | | | |
|---|---|---|---|
| 4,208,089 | 6/1980 | Netto | 359/385 |
| 4,283,111 | 8/1981 | Wieber et al. | 359/381 |
| 4,733,954 | 3/1988 | Reinheimer et al. | 350/358 |
| 4,998,810 | 3/1991 | Sander et al. | 359/385 |
| 5,071,241 | 12/1991 | Brock | 359/390 |
| 5,079,578 | 1/1992 | Kohno et al. | 354/286 |
| 5,235,457 | 8/1993 | Lichtman et al. | 359/368 |

FOREIGN PATENT DOCUMENTS 0211138  2/1987  European Pat. Off. .

*Primary Examiner*—Thong Nguyen
*Assistant Examiner*—Mohammad Y. Sikder
*Attorney, Agent, or Firm*—Foley & Lardner

[57] ABSTRACT

The microscope stand foot serves to accommodate an illumination device having optical components and having an aperture diaphragm and field diaphragm. The latter are assembled in a cylindrical tube held by a carrier, the tube being able to be fastened in the stand foot as a prefabricated unit. In this way, the assembly of the illumination device is simplified. When fastening the carrier in the stand foot, the tube rests under tension on mating surfaces, as a result of which an adjustment of the tube and thus of the optical components is dispensed with.

7 Claims, 4 Drawing Sheets

MICROSCOPE STAND FOOT WITH A CARRIER FOR BRACING A CYLINDRICAL TUBE OF AN ILLUMINATION DEVICE IN A NON-DISPLACEABLE MANNER

BACKGROUND OF THE INVENTION

The invention relates to a microscope stand foot for the accommodation of an illumination device having optical components and drive units for the same. U.S. Pat. No. 5,079,578 discloses a photographic camera system in which various object lenses can be flanged onto a camera housing via a bayonet closure. For the electrical transmission of information to an end of the object lenses and to the camera housing, the bayonet closure has resiliently supported contact pins. The contact pins are allocated corresponding contacts on the object lenses.

A microscope stand foot of this type is known (which is equivalent to U.S. Pat. No. 4,733,954) from EU-0211 138 A2. By means of partitions in the same, individual accommodation chambers for optical and electronic components are formed. Thus, in the accommodation chamber of the central part, an aperture diaphragm, a field diaphragm and a deflection mirror are arranged one behind another, while the accommodation chambers in the side parts are provided for the electronic components and for the drive units of the aperture diaphragm and field diaphragm. This known microscope stand foot, because of its dust-protected and heat-dissipating construction, largely makes possible long-term operation of the microscope, which is hardly disturbed by an otherwise frequently necessary cleaning of the optical components or by focus changes because of thermal expansions. The assembly of the optical components in the central part of this microscope stand foot is, however, relatively complicated and subsequent setting operations also prove to be difficult.

SUMMARY OF THE INVENTION

It is therefore the object of the invention to develop further a microscope stand foot of the type mentioned at the outset in such a way that, given simple assembly and disassembly of the optical components, adjustment of the same in the stand foot is dispensed with.

According to the invention, this object is achieved by providing a microscope stand foot including at least two mating surfaces. The microscope stand foot further comprises a cylindrical tube having an envelope surface. Moreover, assembled within the cylindrical tube is an illumination device. The illumination device includes at least one optical component, an aperture diaphragm, and a field diaphragm. A drive unit for operating each of the diaphragms is operatively connected to each of the diaphragms. A carrier is secured to the microscope stand foot by a fastening device such that the cylindrical tube is braced by the carrier and the envelope surface of the cylindrical tube is pressed onto the at least two mating surfaces.

The objective of the invention is also achieved by supplying the carrier with at least two semicircular curves which engage over and under a periphery of the cylindrical tube to hold the cylindrical tube on the carrier in a rotationally fixed manner.

A further objective of the invention is to have a microscope stand foot which is user friendly. This objective is achieved by providing the microscope stand foot with a focusing device and drive units arranged in a side wall, and wherein the drive units are located one above the other and are located within finger range of the focusing device.

An additional objective of the invention is to have the drive units housed within the microscope stand foot. This objective is achieved by providing the drive units as an axle supported by the carrier and a separate control cable for each diaphragm.

BRIEF DESCRIPTION OF THE DRAWINGS

Further details and features can be seen from the following description of an exemplary embodiment shown schematically in the drawing, in which.

DETAILED DESCRIPTION OF THE PREFERRED EMBODIMENT

Figure 1:
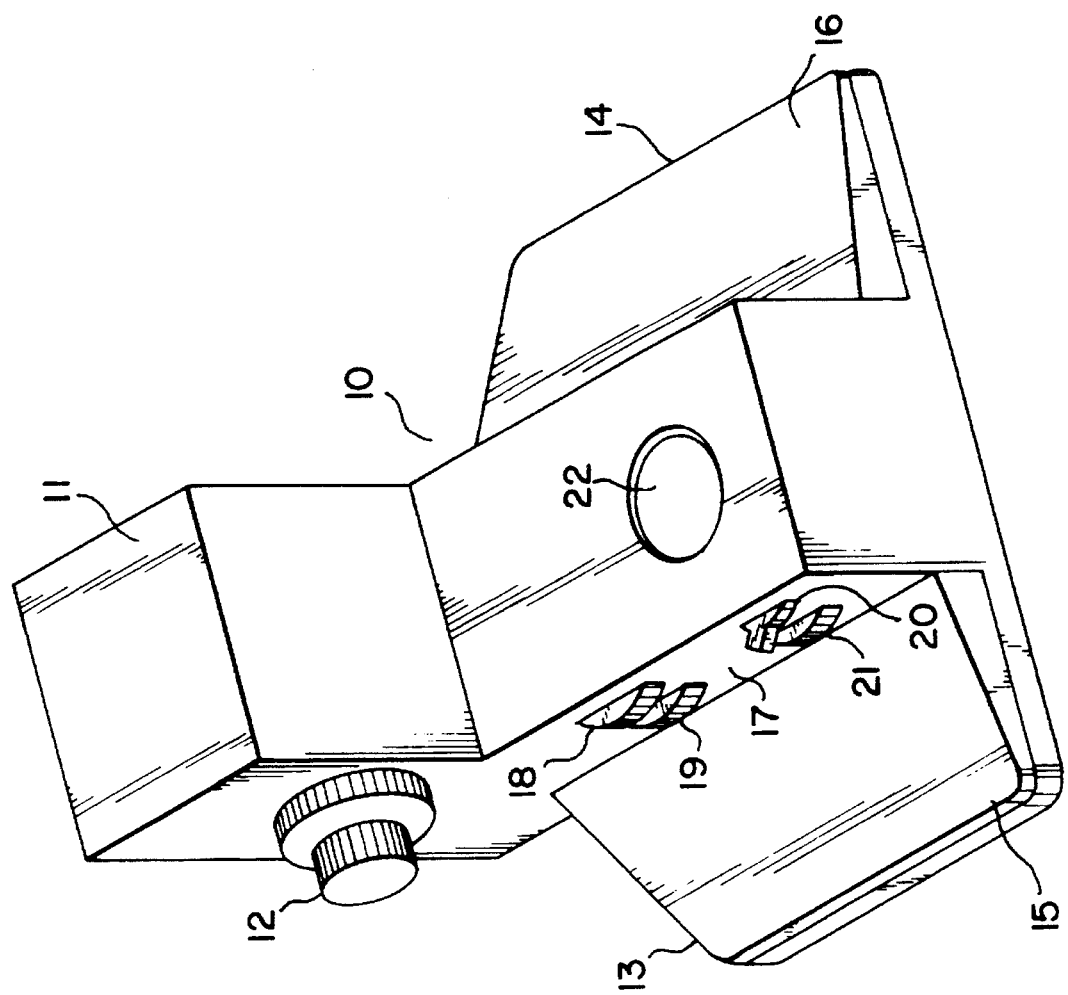
FIG. 1 shows a perspective view of the micro-scope stand foot according to the invention.

The microscope stand foot 10 shown in FIG. 1 is a component of a rectangular stand, of which here only an upright stand 11 with a manual focusing device 12 and side parts 13, 14 with cushioned hand-rests 15, 16 are illustrated. Projecting from a side wall 17 of the microscope stand foot 10, within finger range of the focusing device 12, there are drive units 18, 19 arranged one above another in the form of milled knobs, alongside which further setting devices 20, 21 are provided. The upper side of the microscope stand foot 10 has a light passage opening 22.

Fastened in the stand foot 10 is a carrier 23 which, in the assembled condition, holds a cylindrical tube 24 in a rotationally fixed manner by means of semicircular curves 25 engaging over and under the periphery of the tube, only one of the said curves being shown. On introducing the carrier 23 together with the tube 24 into the stand foot 10, the tube 24 is accommodated by its envelope surface 24' against two upper mating surfaces 26, 26' and two lateral mating surfaces 26", 26'", which are integrally molded on the stand foot 10.

Figure 2:
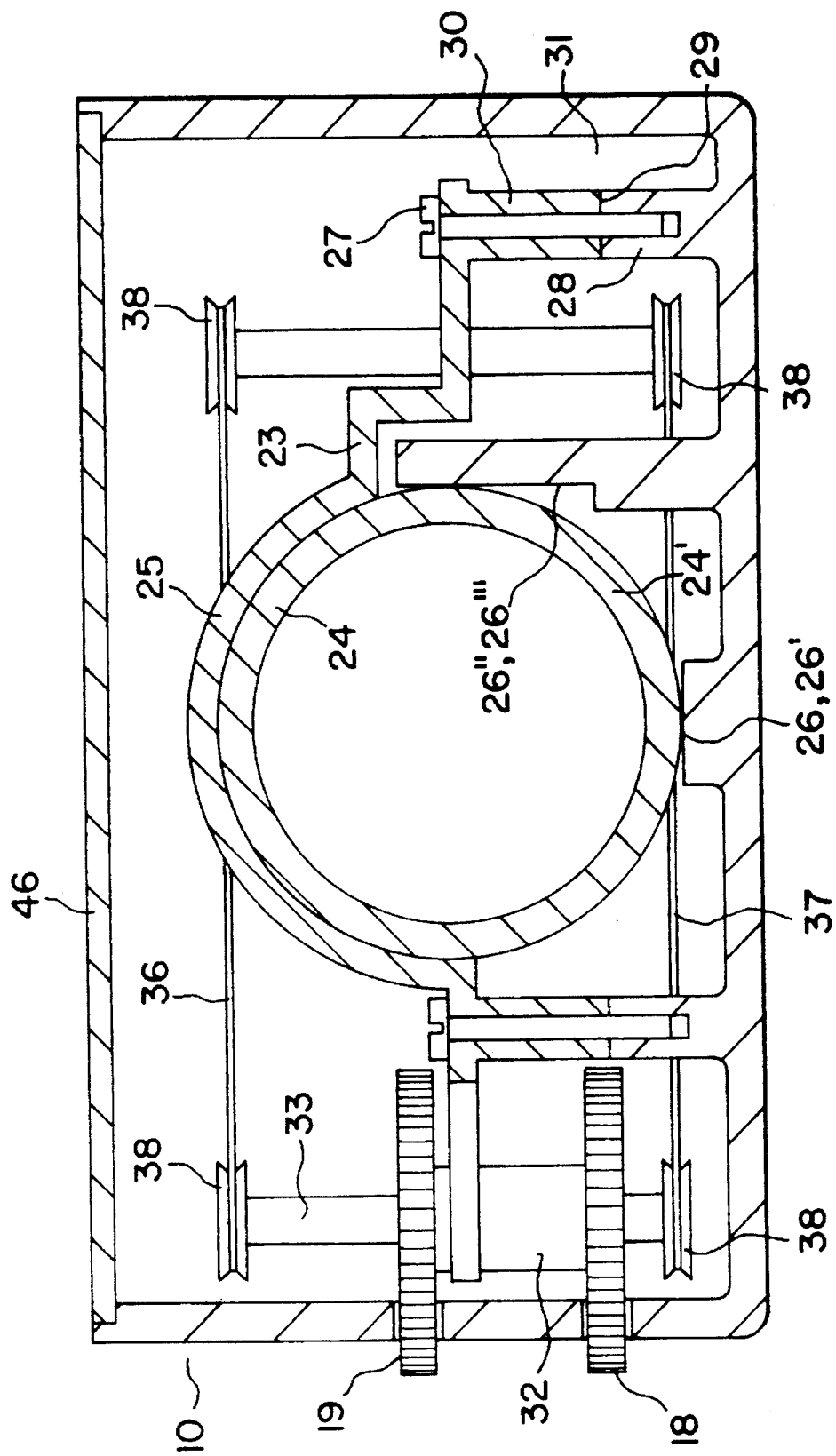
FIG. 2 shows a sectioned front view perpendicular to the optical axis.

The carrier 23 is assembled by means of screws 27 in the stand foot 10, which has for the purpose two likewise integrally molded bases 28 with flat surfaces 29, on which corresponding surfaces of cylindrical projections 30 integrally molded on the carrier 23 rest. The design of the bases 28 and projections 30 arranged on the side of the mating surfaces 26", 26'" is made in this arrangement in such a way that, on placing the carrier 23, a small air gap 31 of approximately 0.5 mm thickness results between the flat surfaces 29 of the two bases 28 and the surfaces of the projections 30. In this way, the tube 24 is fixed under tension (FIG. 2) during screwing down of the carrier 23, which is manufactured from a hard-elastic plastic, such that on envelope surface of the tube 24 is pressed toward the stand foot 10 onto the mating surfaces 26, 26', with the result that an adjustment of the tube 24 and thus of the components mounted therein is dispensed with.

Figure 3:
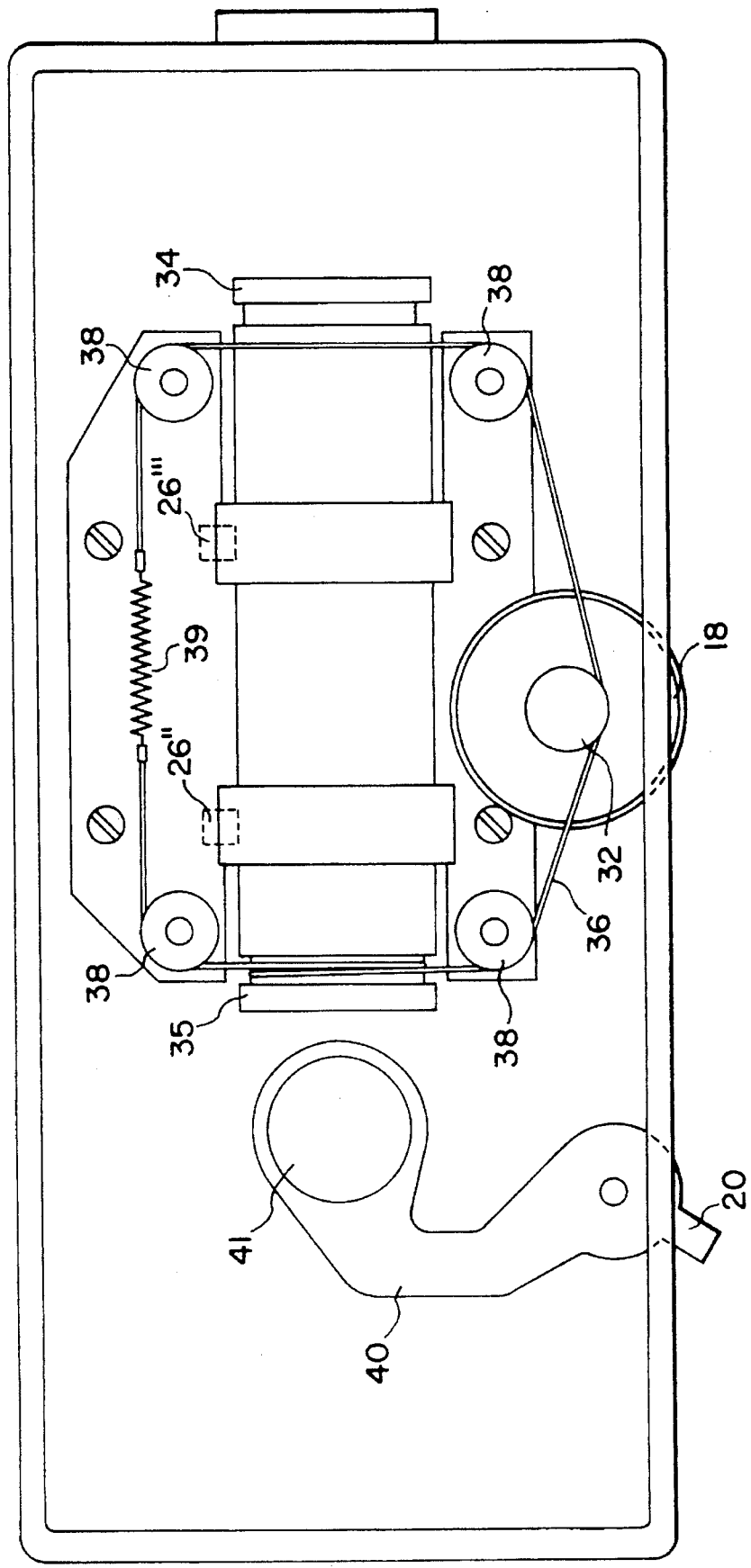
FIG. 3 shows a bottom view and FIG. 4 shows a side view of the microscope stand foot according to the invention in section along the optical axis.

Integrally molded onto the carrier 23 is an axle guide 32 for an axle 33, about which the drive units 18, 19 for an aperture diaphragm and a field diaphragm 34, 35, which drive units lie one above another, can be rotated. In each case, control cables 36, 37 are provided as drive means for controlling the aperture openings, the said control cables being guided in rollers 38 and having tension springs 39 for longitudinal equalization (FIG. 3).

Furthermore, there is arranged in the stand foot 10 a holder 40 for a gray filter 41, which can be pivoted into the illumination beam path by means of the setting device 20, in order to reduce the brightness of a light source, not shown here, without altering the color temperature. The additional setting device 21 can be used, by way of example, for the voltage control of the light source.

Figure 4:
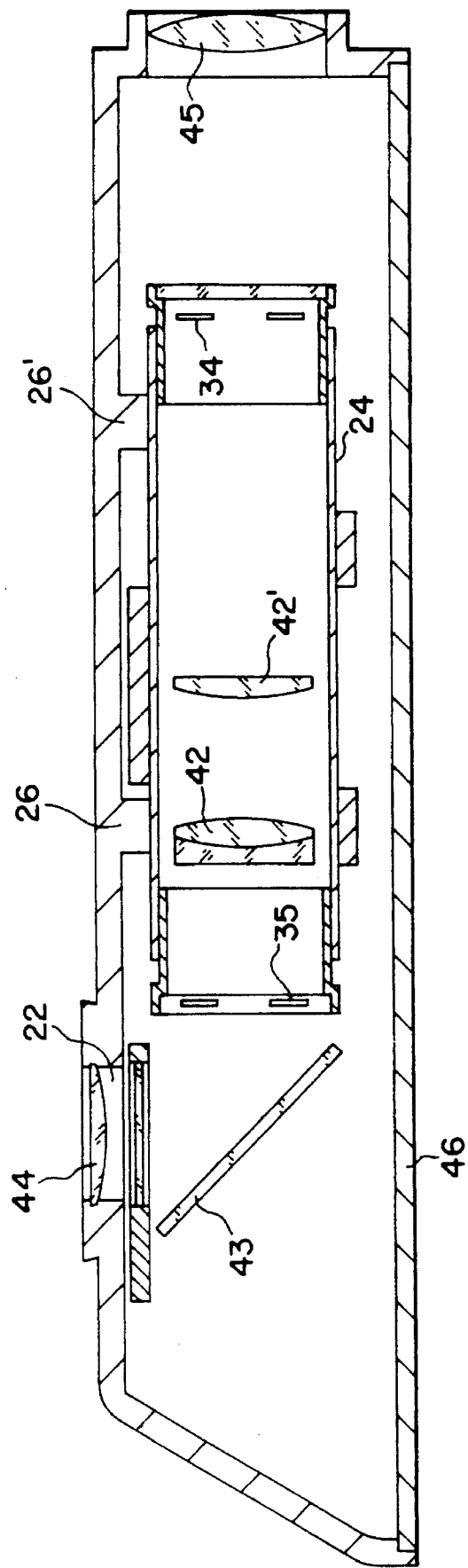

In the tube 24, which is held by the carrier 23 and can be inserted and fastened in the stand foot 10 as a prefabricated unit, apart from the aperture diaphragm and field diaphragm 34, 35, optical components 42, 42' in the form of lenses are additionally assembled, which form an essential part of the illumination device (FIG. 4) together with a deflection mirror 43, arranged outside the tube 24 behind the field diaphragm 35, and the light source, not shown. Above the deflection mirror 43, a planoconvex lens 44 is assembled in the light passage opening 22 as a covering. The stand foot 10 is closed off with respect to the lamp housing, not shown here, by means of a biconvex lens 45 and is covered by a baseplate 46, which enables a convenient insertion of the tube 24 together with carrier 23.

What is claimed is:

1. A microscope stand foot including at least two mating surfaces, said microscope stand foot comprising:

a cylindrical tube having an envelope surface;

an illumination device including at least one optical component, an aperture diaphragm, and a field diaphragm; said at least one optical component, said aperture diaphragm, and said field diaphragm being assembled in said cylindrical tube;

a drive unit operatively connected to each of said diaphragms; and a carrier secured to a surface of said microscope stand foot by a fastening device such that said cylindrical tube is braced under tension in a non-displaceable manner by said carrier and said envelope surface of said cylindrical tube is pressed onto said at least two mating surfaces; and wherein said at least two mating surfaces are integrally disposed on said surface of said microscope stand foot.

2. A microscope stand foot according to claim 1, wherein said carrier comprises at least two semicircular curves which engage over and under a periphery of said cylindrical tube to brace said cylindrical tube on said carrier in a rotationally fixed manner.

3. A microscope stand foot according to claim 1, said microscope stand foot further comprising a focusing device and a side wall, wherein said focusing device and said drive units are arranged in said side wall, and wherein said drive units are located one above the other in relation to said at least two mating surfaces and are located within finger range of said focusing device.

4. A microscope stand foot according to claim 1, wherein said drive units comprise an axle supported by said carrier, and wherein said drive units are operatively connected with said diaphragms by control cables.

5. A microscope stand foot according to claim 2, wherein said drive units comprise an axle supported by said carrier, and wherein said drive units are operatively connected with said diaphragms by control cables.

6. A microscope stand foot according to claim 1, wherein said carrier comprises a hard-elastic plastic material.

7. A microscope stand foot according to claim 1, wherein said at least one optical component comprises two optical components.

\* \* \* \* \*